(12) United States Patent
Rosenstein et al.

(10) Patent No.: US 10,975,258 B2
(45) Date of Patent: Apr. 13, 2021

(54) BISPHENOL A-FREE ETHYLENE (METH)ACRYLIC ACID COPOLYMER COMPOSITION FOR METAL CAN COATINGS

(71) Applicant: Akzo Nobel Coatings International B.V., Arnhem (NL)

(72) Inventors: Jennifer Rosenstein, Mayfield Heights, OH (US); Arvit Nelson, Maple Heights, OH (US)

(73) Assignee: Akzo Nobel Coatings International B.V., Arnhem (NL)

( * ) Notice: Subject to any disclaimer, the term of this patent is extended or adjusted under 35 U.S.C. 154(b) by 140 days.

(21) Appl. No.: 16/095,073

(22) PCT Filed: May 8, 2017

(86) PCT No.: PCT/EP2017/060911
§ 371 (c)(1),
(2) Date: Oct. 19, 2018

(87) PCT Pub. No.: WO2017/194464
PCT Pub. Date: Nov. 16, 2017

(65) Prior Publication Data
US 2019/0106589 A1    Apr. 11, 2019

Related U.S. Application Data

(60) Provisional application No. 62/333,575, filed on May 9, 2016.

(30) Foreign Application Priority Data

Jun. 29, 2016   (EP) .................................... 16176797

(51) Int. Cl.
*B65D 65/42* (2006.01)
*B65D 1/12* (2006.01)
*C08F 220/06* (2006.01)
*C08L 91/00* (2006.01)
*C08L 23/10* (2006.01)
*C09D 123/08* (2006.01)

(52) U.S. Cl.
CPC ......... *C09D 123/0869* (2013.01); *B65D 1/12* (2013.01); *B65D 65/42* (2013.01)

(58) Field of Classification Search
CPC .... C09D 123/0869; B65D 1/12; B65D 65/42; C08F 220/06; C08L 91/00; C08L 23/02
USPC ......................................................... 524/247
See application file for complete search history.

(56) References Cited

U.S. PATENT DOCUMENTS

| 2012/0118785 A1* | 5/2012 | Kainz | .................... | B65D 25/14 |
| | | | | 206/524.3 |
| 2013/0281574 A1 | 10/2013 | Li et al. | | |

FOREIGN PATENT DOCUMENTS

| RU | 2013133849 A | 2/2015 |
| WO | 2013/092539 A1 | 6/2013 |

* cited by examiner

*Primary Examiner* — William K Cheung
(74) *Attorney, Agent, or Firm* — McDonnell Boehnen Hulbert & Berghoff LLP

(57) ABSTRACT

Coating compositions are disclosed that have good blush resistance, abrasion resistance, blister resistance, hardness, and scratch resistance. In some embodiments, the coating compositions are used to coat substrates such as cans and packaging materials for the storage of food and beverages. Coating compositions of the disclosure may be prepared by mixing an ethylene (meth)acrylic acid copolymer and a phenolic crosslinker. The aqueous dispersion may also include a hydroxyalkylamide crosslinker.

20 Claims, No Drawings

BISPHENOL A-FREE ETHYLENE (METH)ACRYLIC ACID COPOLYMER COMPOSITION FOR METAL CAN COATINGS

This application is the US national phase under 35 U.S.C. § 371 of international application PCT/EP2017/060911, filed May 8, 2017, which claims priority to U.S. Provisional Application No. 62/333,575, filed May 9, 2016 and European application 16176797.5, filed Jun. 29, 2016.

BACKGROUND OF THE INVENTION

Field of the Invention

The present disclosure relates to aqueous dispersions having a ethylene (meth)acrylic acid copolymer, a phenolic crosslinker, and optionally a hydroxyalkylamide crosslinker, methods of coating substrates with the foregoing, and substrates coated with the foregoing.

Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable. There is also a desire to eliminate surfactants from such coating compositions, because the surfactants could in theory dissolve in the beverages.

High acid content, high melt index ethylene (meth)acrylic acid copolymers are dispersible in alkali aqueous dispersions under proper reaction conditions. Such aqueous dispersions are widely used in glues and other adhesives, personal care applications, and paper coating applications. U.S. Pat. No. 7,803,865 describes a process to prepare such aqueous dispersions in an extruder. However, ethylene (meth)acrylic acid copolymer dispersions are hydrophilic and have poor chemical resistance and poor blush resistance. Crosslinkers (such as melamine formaldehyde, urea formaldehyde, phenol formaldehyde, an alkali metal hydroxide, a zinc/zirconium complex, and an epoxy resin) have been used to improve chemical and blush resistance, but these crosslinkers do not produce a coating with sufficient chemical and blush resistance required for many packaging coating applications. Also, such compositions tend to absorb flavorants from the food or beverage which affects the taste. US 2012/0118785 describes aqueous dispersions containing a base polymer and a stabilizing agent, wherein the base polymer may be an ethylene acrylic-acid co-polymer. However, the ethylene acrylic-acid co-polymer described in US 2012/0118795 as the base polymer requires the use of an additional stabilizing agent. As understood at the time, it was believed that the higher molecular weight provided by the base polymer was needed to provide improved coating properties, such as improved flexibility and/or ease of control of crystallinity.

SUMMARY OF THE INVENTION

The present inventors recognized the desirability of coating compositions that do not contain bisphenol A or are substantially free of bisphenol A and do not affect the flavor of the food or beverage within the container. Accordingly, the coating compositions of the present disclosure comprise aqueous dispersions of ethylene (meth)acrylic acid copolymers. The coating compositions of the present disclosure include certain crosslinkers to crosslink aqueous ethylene (meth)acrylic acid copolymers and/or self-condense, thereby providing a unique combination of properties such as water resistance, flexibility, chemical resistance, corrosion resistance and excellent adhesion on substrates. As used herein "ethylene (meth)acrylic acid copolymers" refers to ethylene acrylic acid (EAA) copolymers and ethylene methacrylic acid (EMA) copolymers. The coating compositions of the disclosure may comprise EAA, EMA, or both. The coating compositions may comprise more than one EAA, and/or more than one EMA. In other approaches, the coating compositions of the present disclosure may comprise only one ethylene (meth)acrylic acid copolymer such as one EAA copolymer or one EMA copolymer.

The present disclosure provides an alternate to epoxy resins that still allows formaldehyde-free cure, blush resistance, capability to retort and can withstand hard-to-hold beverages.

The coating compositions of the disclosure can be made with a simple process, not requiring multiple polymers or processing stages to achieve the intended effect. By using ethylene(meth)acrylic acid copolymer having number average molecular weight of 2500-4500 Da, a weight average molecular weight of 5500-9000 Da, and a (meth)acrylic acid content of 15-20%, the inventors discovered that it is possible to prepare coating compositions comprising ethylene (meth)acrylic acid copolymer with desirable coating properties, and without the need for a stabilizing agent.

In addition to ethylene (meth)acrylic acid copolymer, the coating compositions of the disclosure include a phenolic crosslinker and, optionally, a solution acrylic dispersant, an acrylic rheology modifier, a betahydroxy alkylamide crosslinker (e.g., Primid XL552), solvents and/or additives.

The coating compositions of the disclosure are suitable, inter alia, as packaging coatings for food and beverage packaging and containers, including beer and beverage external/interior easy-open-ends and plastic bottles.

The present disclosure also provides methods of coating substrates with the coating composition and substrates coated with the aqueous dispersions.

The coating disclosed herein is free of Bisphenol A that is currently used in the epoxy food can coatings. The coating is unique in that the use of EAA and/or EMA copolymers is predominantly found in the hot melt adhesive market and not in coatings as the primary resin.

DETAILED DESCRIPTION OF THE INVENTION

The present disclosure includes substrates coated at least in part with an coating composition of the disclosure and methods for coating the substrates. The term "substrate" as used herein includes, without limitation, plastic bottles, cans, metal (such as aluminum) cans, beer and beverage easy-open-ends, packaging, containers, receptacles, or any portions thereof used to hold, touch or contact any type of food or beverage. Also, the terms "substrate," "food can(s)," "food containers" and the like include, for non-limiting example, "can ends," which can be stamped from can end stock and used in the packaging of beverages.

In some embodiments, the coating composition of the disclosure comprises ethylene (meth)acrylic acid copolymer, a phenolic crosslinker, a solution acrylic dispersant, an acrylic rheology modifier, a betahydroxy alkylamide crosslinker (e.g., Primid XL552), solvents and additives.

The ethylene (meth)acrylic acid copolymers of the coating compositions of the disclosure have a number average molecular weight of 2500-4500 Da, a weight average molecular weight of 5500-9000 Da, and a (meth)acrylic acid content of 15-20% (see, for example, Examples 1-2, below). Ethylene (meth)acrylic acid copolymers suitable for use in the coating compositions of the disclosure are well known in the art and commercially available. Without limitation, suitable ethylene (meth)acrylic acid copolymers include Primacor® (EAA) resins available from Dow Chemical (such as Primacor® 59801 (EAA, acrylic acid 20 wt %) and Primacor® 59901 (EAA, 20.5 wt % acrylic acid), Nucrel® resins available from DuPont (such as Nucrel® 2806 (EAA, 18 wt % acrylic acid), Nucrel® 925 (EMA, 15 wt % methacrylic acid), and Nucrel® 960 (EMA, 15 wt % methacrylic acid)), Honeywell A-C® 5180 (EAA, 20 wt % acrylic acid and acid number 185-225 mg KOH/g), and Honeywell A-C® 5120 (EAA, 15 wt % acrylic acid and acid number 112-130 mg KOH/g), and the like, as well as combinations thereof.

In some embodiments, the ethylene (meth)acrylic acid copolymer is first dispersed in water (20 to 35% wt % solids of ethylene (meth)acrylic acid copolymer) and neutralized with a base (e.g., an amine base such as triethanol amine (TEA), dimethylethanol amine (DMEA), or dithethylamino ethyl (DEAE)). The neutralization may be conducted at temperature of about 95 to about 120° C. for about 10 minutes is suitable. The process of dispersing EAA is preferably carried out at a minimum of about 90° C. in an open reactor. If a closed reactor is used, temperatures of about 105 to about 120° C. may be used to make an aqueous dispersion having greater than 20% solids.

The ethylene (meth)acrylic acid copolymer may be present in an amount from about 30 to about 90 wt % of the aqueous dispersion (e.g., 30, 35, 40, 45, 50, 55, 60, 65, 70, 75, 80, 85, or 90%). (As used herein, when a series of specific values of a parameter (such as the wt % of ethylene (meth)acrylic acid copolymer in an aqueous dispersion of the disclosure) are given it is intended to include each value as well as ranges between any two values. So, for example, the amount of ethylene (meth)acrylic acid copolymer can be any of the amounts just listed as well as ranges such as 45-50 wt %, 40-80 wt %, etc.).

In some embodiments, the aqueous dispersion of ethylene (meth)acrylic acid copolymer(s) is surfactant free. In other embodiments, the aqueous dispersion of ethylene (meth) acrylic acid copolymer(s) is stable and remains dispersed without the need for a stabilizer, such that the aqueous dispersion of ethylene (meth)acrylic acid copolymer(s) is substantially stabilizer free, or contains no stabilizing agents. The particle size of the dispersions can been determined by dynamic light scattering (DLS) and laser diffraction spectroscopy (LDS). For stability and application, preferred dispersions have a DLS and LDS volume weighted average of less than 1 micrometer and a number weighted average of less than 0.5 micrometers particle size.

In some embodiments, the aqueous dispersion of ethylene (meth)acrylic acid copolymer(s) comprises more than one ethylene (meth)acrylic acid copolymer(s). In one embodiment, the aqueous dispersion of ethylene (meth)acrylic acid copolymer(s) contains two ethylene (meth)acrylic acid copolymer(s), such as two ethylene (meth)acrylic acid copolymer(s) wherein the ratio of one ethylene (meth)acrylic acid copolymer to the other is no greater than 3:1, or no greater than 2:1.

Phenolic crosslinkers can be added to the coating composition of the disclosure directly or included in the ethylene (meth)acrylic acid copolymer-containing aqueous dispersion. Examples of suitable phenolic crosslinkers include, without limitation, PHENODUR® EP 560, PH2028, PH2013/65B, and PR899/60MPC; Hexion's PF6535LB, SI Group's SFC112/65 (butyl phenol resin), Ruters's 7700 LB, or a combination thereof. For example, if the phenolic crosslinker is PHENODUR® EP 560 (a butyl etherified phenol formaldehyde crosslinker), 5 to 25 wt % may be used (e.g., 5, 10, 15, 20, and 25 wt %).

In certain embodiments, the coating compositions of the present disclosure do not contain or are substantially free of bisphenol A. As used herein, the term "substantially free" means that there is no more than 1.0% by weight, preferably no more than 0.5% by weight, and more preferably no more than 0.1% by weight of the compound, or structural units derived from the compound, present in the coating composition.

In some embodiments, the coating composition of the disclosure may include a hydroxyalkylamide crosslinker. The hydroxyalkylamide crosslinker helps improve corrosion resistance when the coating composition is used as a protective coating that contacts the food or beverages, and, so, a hydroxyalkylamide crosslinker may be desirable to use when the coating is intended for such use. The hydroxyalkylamide crosslinker may include without limitation a betahydroxyalkylamide crosslinker, such as Primid® XL-552 (N,N,N',N'-tetrakis-(2-hydroxyethyl)-adipamide).

In addition to the hydroxyalkylamide crosslinkers, additional crosslinkers may be used in the coating compositions of the disclosure. Suitable additional crosslinkers can include, but are not limited to, urea-formaldehyde, phenol-formaldehyde, benzoguanamine formaldehyde, phenolic resins, and combinations thereof. Other crosslinkers that may be used include oxazoline, oxetane and dioxetane. Still other crosslinkers that may be used but are less preferred are melamine formaldehyde, urea formaldehyde, phenol formaldehyde, an alkali metal hydroxide, a zinc/zirconium complex, and an epoxy resin. In some embodiments, the amount of the additional crosslinker is about 0.1 to about 30 wt % based on the total polymer solids content in the aqueous dispersions. The crosslinker may help improve chemical resistance and/or water blush resistance. However, if the amount of the crosslinker is too high, the film may lose flexibility. Whether the amount of crosslinker is too high is routinely determinable to those skilled in the field of such coatings.

The phenolic and hydroxyalkylamide polymers may or may not crosslink (self-condense or crosslink with EAA or EMA). But such crosslinking improves the chemical resistance of the coating and, therefore, may be desirable. Curing for 5-10 minutes at 215-220° C., for example, is expected to result in an advantageous amount of crosslinking, but it is a routine task to vary conditions to adjust and optimize the degree of crosslinking for a particular application.

The coating compositions of the disclosure may include a neutralizer such as without limitation ammonia/ammonium hydroxide, a tertiary amine, dimethylethanolamine, 2-dimethylamino-2-methyl-1-propanol, tributylamine, morpholine, diethanolamine, triethanolamine, monoethanolamine, sodium hydroxide, potassium hydroxide, lithium hydroxide, and the like, as well as combinations thereof.

In some embodiments, the neutralizer is present in an amount from about 20 to 100% mole-to-mole of acid in the compound to be neutralized.

In addition to water, the coating compositions of the disclosure may include an organic solvent. Organic solvents may facilitate spray applications as well as assist in suspending the phenolic resin and solution acrylic dispersant in the water. Whether to include an organic solvent and the identity and amount of solvent can be easily determined by routine methods known in the art. Solvents may include without limitation xylene, benzene, ethyl benzene, toluene, alkoxy alkanols, methanol, ethanol, propanol, butanol, alkyl ethers of ethylene, alkyl ethers of propylene glycol, ethylene glycol monobutyl ether, ethylene glycol ethyl ether, diethylene glycol monobutyl ether, a ketone, an aromatic solvent, an ester solvent, a hydroxyl functional solvent, and combinations thereof. The amount of the solvent in the aqueous dispersion may be up to about 90% by weight of the polymeric solids, or from about 20% to about 45% by weight of the coating composition (e.g., 20, 25, 30, 35, 40, or 45 wt %). The amount of water in the aqueous dispersion may range from about 20 to about 50 wt %.

The glass transition temperature (Tg) of the coating composition may depend on the total monomer composition and may contribute to blush resistance, lube bloom, and abrasion resistance. As non-limiting example, if the polymer has high amounts of methacrylic acid (e.g., between 5% and 20% of total polymer), then the polymer may have a higher Tg. In some embodiments of the disclosure, the Tg is from about 5 to about 50° C. If the Tg is too low, the film may be too soft and may have insufficient abrasion resistance. If the Tg is too high, the film may wrinkle and may not have enough flexibility which may decrease film performance. The cure temperature may be about 200 to about 300° C.

The coating compositions can include conventional additives known to those skilled in the art, such as without limitation, additives to control foam, reduce equilibrium and dynamic surface tension, or to control rheology and surface lubricity. Amounts can vary depending on desired coating application and performance in any manner known to those skilled in the art.

The coating compositions of the disclosure may include a solution acrylic dispersant. (Solution acrylics are also known as solvent acrylics and are well known in the art.) The solution acrylic dispersant serves to disperse into the water phase any component that does not readily disperse in water, including the phenolic crosslinker and solvents. Without the acrylic dispersant, the coating may separate into two distinct phases. Dispersants (also referred to as surfactants) include liquids that can disperse small droplets or particles. For example, dispersants can include a mixture of emulsifiers and solvents that break oil components into smaller droplets for incorporation throughout the water. Dispersants that can be used include polymeric or oligomeric surfactant based dispersing agents. The solution acrylic dispersant of Example 3 (below) can be used, for example. Other solution acrylic dispersants useful in the coating compositions of the disclosure are known in the art and are commercially available (e.g., from LUBRIZOL®, Wickliffe, Ohio). The acrylic dispersant can be used in an amount of 5 to 20% by weight of the aqueous dispersion (e.g. 5, 7.5, 10, 12.5, 15, 17.5, or 20 wt %).

The coating composition of the disclosure may include an acrylic rheology modifier. The acrylic rheology modifier acts to swell and improve shear thinning properties required for spray application of the coating. Example 4 (below) describes a suitable acrylic rheology modifier for use in the aqueous dispersions of the disclosure. Other acrylic rheology modifiers useful in the coating compositions of the disclosure are known in the art, such as alkali swellable and hydrophobically modified alkali swellable modifiers. Acrylic rheology modifiers are also commercially available, such as from BASF (Rheovis AS and Rheovis HS). The acrylic rheology modifier can be used in an amount of 0.5 to 5% by weight of the aqueous dispersion (e.g., 0.5, 1, 1.5, 2, 2.5, 3, 3.5, 4, 4.5, or 5 wt %). Optimization of the balance of sag and flow of the coating composition is preferable to achieve uniform coverage over the bead rolls of a food can. Without the acrylic rheology modifier the shear profile of the coating may not be shear thinning, and the coating may run and not flow uniformly over the beads. It will be a routine matter for those of ordinary skill in the field of can coatings to determine the appropriate composition and amount of acrylic rheology modifiers for each type of application.

The coating compositions of the present disclosure can be made by a multi-step process. An EAA or EMA dispersion can be made by dissolving the co-polymer into a solution of amine (or other neutralizing agent) and water. This mixture is then stirred until the desired particle size is achieved. A solution acrylic dispersion can be made by reacting acrylic monomers in a solvent blend followed by dispersing the reacted material into water and amine. An acrylic rheology modifier can be made as a latex in a manner well known to those skilled in the art. The coating composition in the disclosure can be made by blending all the raw materials together in the following order: Phenolic resin, solvent, solution acrylic dispersant, solvent, EAA dispersion(s), hydroxyalkyl amide crosslinker, acrylic rheology modifier, solvent, water, additives. The resulting mixture can be blended with a cowls blade at high speed (800-1500 rpm). Modification of this method and adaptation for particular applications can be routinely conducted following the teachings of this application and common knowledge in the art of manufacturing compositions for coating food and beverage cans, plastic bottles, and the like.

The present disclosure also provides a method of coating a substrate wherein the coating composition according to the present disclosure is applied to the substrate, which is preferably a food or beverage container, more preferably a bottle or a can. The coating compositions of the disclosure may be applied to a substrate alone or in combination with other coatings. Non-limiting example examples of other coatings that can be used in conjunction with the coating composition of the disclosure include a prime coat, which may be applied between the substrate and coating composition of the disclosure.

Substrates on which the coating composition of the disclosure can be applied include cans, metal cans, beer and beverage easy-open ends, packaging, containers, receptacles, can ends, or any portions thereof used to hold or touch any type of food or beverage.

The coating compositions of the disclosure can be applied to substrates in any manner known to those skilled in the art. In some embodiments, the coating compositions are sprayed onto a substrate. When spraying, the coating compositions may contain, for non-limiting example, from about 10 to about 30% by weight of the polymeric solids relative to about 70 to about 90% water including other volatiles such as, without limitation, minimal amounts of solvents, if desired. For some applications, typically those other than spraying, the coating compositions may contain, for non-limiting example, from about 20 to about 60% by weight of the polymer solids. Organic solvents may be utilized in some embodiments to facilitate spray or other application methods and such solvents may include, without limitation, n-butanol, 2-butoxy-ethanol-1, xylene, toluene, and mixtures thereof. In some embodiments, n-butanol is used in combination with 2-butoxyethanol-1. The coating compositions of the present disclosure may be pigmented and/or opacified with known pigments and opacifiers in some embodiments. For many uses, including food use for non-limiting example, the pigment may be titanium dioxide.

The coating compositions may be applied in some embodiments by conventional methods known in the coating industry. Thus, for non-limiting example, spraying, rolling, dipping, and flow coating application methods can be used for both clear and pigmented films. In some embodiments, after application onto a substrate, the coating compositions may be cured thermally at temperatures in the range from about 215 to about 250° C., and alternatively higher for a time sufficient to effect complete curing as well as volatilizing any fugitive components therein.

For substrates intended as beverage containers, the coating compositions may be applied in some embodiments at a rate in the range from about 0.5 to about 15 milligrams per square inch of polymer coating per square inch of exposed substrate surface. In some embodiments, the coating compositions may be applied at a thickness from about 1 to about 25 microns.

For substrates intended as beverage easy-open-ends, the coating compositions are applied in some embodiments at a rate in the range from about 1.5 to about 15 milligrams of polymer coating per square inch of exposed substrate surface. Conventional packaging coating compositions are applied to metal at about 232 to about 247° C. Some of the coating compositions of the current disclosure achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body.

The coating compositions of the present disclosure may comprise a relatively homogenous water dispersion particle structure and/or an inhomogeneous water dispersion particle structure. The coating composition's particle structure may be controlled by the polymerization processes, including, for example, a multi-stage polymerization process. Such particle structures are usually prepared by a series of consecutive emulsion polymerization sequences with different monomer types, where the second stage monomer is polymerized in the presence of seed water dispersion particles.

The coating compositions of the disclosure can include conventional additives known to those skilled in the art, such as without limitation, additives to control foam, reduce equilibrium and dynamic surface tension, or to control rheology and surface lubricity. Amounts can vary depending on desired coating application and performance and are routinely determinable by those skilled in the art.

EXAMPLES

Each of the Examples below was conducted as described.

Example 1

EAA Dispersions and Associated Method of Manufacture

For a 75 lbs. batch at 28% solids, 22.5 lbs of Ethylene Acrylic acid ("EAA," Honeywell A-C® 5180: molecular number=2568.5, molecular weight=5933.5, polydispersity=2.31, acid value=200 mg KOH/g, % acrylic acid=20) is melted at 100° C. until pourable (overnight). 211 bs of melted ethylene acrylic acid is added to a 10 gallon mixer fitted with $N_2$ blanket, overhead mixing, heating/cooling and temperature monitoring. The ethylene acrylic acid is heated to 125° C., once at temperature 2.25 lbs (10% on solids) of dimethylethanolamine (Sigma Aldrich) is added and mixed for 20 minutes to combine. The temperature must be closely monitored due to possible exotherm. In a separate mixer, 51.75 lbs of DI $H_2O$ (DI $H_2O$ is deionized so the mineral content is less than 1%) is heated to 95° C. After the ethylene acrylic acid and dimethylethanolamine are well mixed, the heated water is added to the mixer over no more than 10 minutes. During water addition the mix speed is increased slowly to maximum. Once all water is added the temperature is allowed to rebound to 95° C. and the dispersion is mixed at high speed for 10 minutes. The dispersion is then cooled below 50° C. and filtered through a can approved 10 μm filter. The non-volatiles content and particle size are measured and the dispersion is monitored for separation.

Example 2

EAA Dispersions and Associated Method of Manufacture

For a 150 lbs. batch at 25% solids, 37.5 lbs of Ethylene Acrylic acid (Honeywell A-C® 5120: molecular number=4000.5, molecular weight=8678.5, polydispersity=2.165, acid value=120 mg KOH/g, % acrylic acid=15) is melted at 100° C. until pourable (overnight). The melted ethylene acrylic acid is added to a 10 gallon mixer fitted with $N_2$ blanket, overhead mixing, heating/cooling and temperature monitoring. The ethylene acrylic acid is heating to 110° C., once at temperature 4.5 lbs (12.1% on solids) of dimethylethanolamine (Sigma Aldrich) is added and mixed for 10 minutes to combine. The temperature must be closely monitored due to possible exotherm. In a separate mixer, 107.65 lbs of DI $H_2O$ is heated to 95° C. After the ethylene acrylic acid and dimethylethanolamine are well mixed, the heated water is added to the mixer over 30 minutes. During water addition the mix speed is increased slowly to maximum. Once all water is added the temperature is allowed to rebound to 95° C. and the dispersion is mix at high speed for 30 minutes. The dispersion is then cooled below 50° C. and filtered through a can approved 10 μm filter. The non-volatiles content and particle size are measured and the dispersion is monitored for separation.

We tested dispersions with 25, 28, or 30% solids, with the amine triethanol amine (TEA), dimethylethanol amine (DMEA), or dithethylamino ethyl (DEAE), and with an amine level of 3, 5, or 7% of the aqueous dispersion for the dispersions of both Example 1 and Example 2.

The 28% EAA dispersion containing A-C® 5180 of Example 1 using 3% DMEA and the 25% EAA dispersion containing A-C® 5120 using 3% DMEA were found to be optimal for stability, particle size of the dispersion, and for compliance with food coating requirements.

The particle size of the dispersions was determined by dynamic light scattering (DLS) and laser diffraction spectroscopy (LDS).

Example 3

Solution Acrylic Dispersant and Associated Method of Manufacture

For a 100 lb. blend, add 6 lbs. of each butyl cellosolve (BC) and butanol to a reactor fitted with $N_2$ blanket, overhead mixing, heating/cooling and temperature monitoring. The reactor is heated to 117° C. In a separate reactor pre mix the following monomers: 8.439 lbs. Sipomer PAM-200

(Rhodia) (phosphate ester of poly(propylene glycol) methacrylate), 11.252 lbs. hydroxypropyl methacrylate and 8.439 lbs. ethylhexyl methacrylate with 0.422 lbs t-butyl peroctoate, 4.1 lbs. BC and 3.114 lbs. butanol. Add the monomer mix to the solvent reactor over 3 hours, monitoring temperature closely as exotherm is possible. After all monomer mix is added, rinse the monomer reactor with 0.751 lbs. butanol and add to the main reactor. Add 0.140 lbs. of t-butyl peroctoate and 0.237 lbs. butanol and hold for 1 hour at 117° C. After 1 hour hold add 3.653 lbs. of dimethylethanolamine over 10 minutes, followed by an addition hold at 117° C. for 30 minutes. After 30 minutes hold, cool reactor quickly to 92-97° C. Once cool, add 47.25 lbs. of DI water over 30 minutes, maintaining temperature of 85-90° C. After addition is complete hold at 85° C. for 15 minutes. After hold, turn off $N_2$ and cool reactor to 35° C. and filter through a 25 μm can approved filter.

The degree of neutralization was evaluated from 132% to the preferred level of 70% neutralization. The reduced amount of amine improved compatibility and performance of the coating(s).

Example 4

Acrylic Rheology Modifier

For a 100 kg batch, charge 53.87 kg of DI $H_2O$ to a reactor fitted with $N_2$, overhead mixing, heating/cooling and temperature monitoring. Pre-mix 0.0638 kg dodecylbenzene sulfonic acid (Nacure 5076), 0.2953 kg DI $H_2O$ and 0.10 kg ammonia (91%) and add to reactor and heat to 80° C. with $N_2$ sparge. Once the reactor reaches 80° C. change $N_2$ sparge to blank and add a premix of 0.2789 kg Methacrylic acid, 1.6780 kg Styrene, and 0.8669 kg Ethyl Acrylate, and 0.1427 kg glycidyl methacrylate, hold for 15 minutes. After hold add a premix of 1.1404 kg DI $H_2O$ and 0.1484 kg ammonium persulfate and hold for 15 minutes. Premix the monomer feed of 2.5089 kg methacrylic acid, 15.1015 kg styrene, 7.8 kg ethyl acrylate, and 1.2842 kg glycidyl methacrylate and premix the initiator feed of 0.0638 kg Nacure 5076, 4.45 kg DI $H_2O$ and 0.010 kg ammonia (91%). Feed the monomer and initiator premixes into the reactor over 3 hours holding the reactor at 80° C. After feeds are complete, rinse the premix vessels and lines with 2.3731 kg DI $H_2O$. Premix 0.0289 kg ascorbic acid and 0.2968 kg DI $H_2O$, add to reactor and hold for 5 minutes. After 5 minutes add 0.0742 kg t-butyl peroxybenzoate (Trigonox C) and rinse vessel with 0.2969 kg DI $H_2O$, add to reactor and hold for 30 minutes at 80° C. Premix 0.7216 kg dimethylethanolamine and 6.4942 kg DI $H_2O$, add to reactor and hold for 60 minutes. After hold cool batch to below 30° C. and filter through a can-approved filter.

Example 5

Coating Composition—Lower Phenolic Formula

For a 10 gallon (38 kg) batch, add 2.83 kg phenolic resin (EP-560, 68-71% solids in BuOH) to a mixing vessel with a cowls blade. Begin mixing at 500 rpm and add 1.66 kg butyl cellosolve and 1.22 kg DI $H_2O$, mix until well blended (approx. 1 minute). After well blended, add 1.84 kg of solution acrylic of Example 3 (28% solids), increase mix speed during addition to 800 rpm. Once all solution acrylic is mixed in, add 1.67 kg butanol and 1.22 kg DI $H_2O$. Allow blend to mix at 800 rpm for 1 minute. Add 22.24 kg A-C® 5180 dispersion (28% solids) of Example 1, during addition increase mix speed to 1000 rpm. Add 0.57 kg β-hydroxyalkyl amide crosslinker (Primid XL 552, EMS Griltech), and 1.75 kg 72135 acrylic rheology modifier (28% solids) of example 5. Allow to mix at 1000 rpm for 1 minute. Add 1.67 kg butanol, 1.24 kg Di $H_2O$ and 0.06 kg defoamer (Byk 1740) and mix for 5 minutes.

Example 6

Coating Composition—Higher Phenolic Formula

For a 4.137 kg batch, the following are required: utilizing a cowls type dispersion blade for mixing and a mixing vessel large enough to hold the contents, along with a benchtop mixer. Add to the mixing vessel 0.57 kg phenolic resin EP 560, start mixing at a speed of 700 rpm, and let mix for 3 minutes. Add 0.1417 kg butyl cellosolve, mix until well blended. Add 0.1983 kg deionized water, mix until well blended. Add 0.6285 kg solution acrylic from Example 3, mix until well blended. Add 0.1133 kg butanol, mix until well blended. Add 0.1983 kg deionized water, mix until well blended. Add 1.1894 kg AC5180 dispersion of example 1, mix until well blended. Add 0.600 kg AC5120 dispersion of example 2, mix until well blended. Add 0.2099 kg the acrylic rheology modifier of Example 4, mix until well blended. Add 0.0453 kg propylene glycol, mix until well blended. Add 0.0136 kg ethylene glycol, mix until well blended. Add 0.0793 kg butanol, mix until well blended. Add 0.150 kg deionized water, mix until well blended.

Performance Test Methods and Results Compared to Epoxy Coating

The coating compositions of Example 5 and Example 6 were used to coat cans in a standard, art-recognized method. Briefly, application of the coating was conducted with airless spray system, the coating being pumped through a specified nozzle and spray gun and applied to the inside of the container.

Simulants Tests for Food Packs

Brine Test Method—A 2% sodium chloride solution is made, using 99% pure sodium chloride and deionized water. The solution is mixed until the sodium chloride is dissolved. Cans are filled with the 2% sodium chloride solution to the top bead of the food can. The bead is the roll added to the food can to provide strength. Actual volume of solution is dependent on the size of the can. Cans are sealed with a can end using a bench top seamer. Process the cans in a retort chamber for 90 minutes at 250° F. at 17 psi. Retort is a sterilization process used in the food canning industry. Following the 90 minute process, the cans are cut open and rated for corrosion, and adhesion. The performance rating occurs in the vapor phase of the can and the liquid phase.

The brine test is a corrosion test that examines the coating resistance to a corrosive environment such as would be seen with foods packed into metal cans.

Adhesion is evaluated by using a cross hatch to generate a grid of squares within a 1 square area. The grid is then covered with a clear tape and pulled to determine the removal of the coating from the grid. The adhesion is rated using the 0 to 10 scale, with 0 no adhesion loss and 10 is 100 percent adhesion loss.

The rating scale for corrosion and blush is as follows:

Lactic Acid Test Method—Fill cans with 1% lactic acid solution to top of beads. Seal cans using a bench top seamer. Process in a retort for 90 minutes at 250 degrees Fahrenheit. Following the 90 minute process, the cans are cut open and rated for corrosion, blush and adhesion.

Blush is a chemical resistance measurement of the coating to resist the uptake of water/solution that it is immersed. The absorption of water results in a white or blush appearance. The blush is rated on a scale of 0 no blush to 10 coating is completely white.

Mushy Pea Test—Soak dried peas overnight. Drain peas. To a can add 250 grams of drained peas, also add 100 mL of 5% sodium thiosulfate solution. Fill can to 0.25 inch headspace with 140 Fahrenheit degrees deionized water. Seal cans using a bench top seamer. Process in a retort for 180 minutes at 250° F. Cans are cut in half after 24 hours and 48 hours then evaluated for sulphide staining.

Test Results

Food can and panel rating system

| Rating | Description |
| --- | --- |
| 0 | No failure |
| 1 | No failure to very slight failure |
| 2 | Very slight failure |
| 3 | Very slight to slight failure |
| 4 | Slight failure |
| 5 | Slight to moderate failure |
| 6 | Moderate failure |
| 7 | Moderate to severe failure |
| 8 | Severe failure |
| 9 | Severe to complete failure |
| 10 | Complete failure |

Brine Test

| | Corrosion (VP/LP)[1] | Adhesion (VP/LP) | Blush(VP/LP) |
| --- | --- | --- | --- |
| Epoxy Control | 0/3 | 1/1 | 0/1 |
| High Phenolic | 0/1 | 1/1 | 0/1 |
| Low Phenolic | 0/3 | 1/1 | 1/1 |

[1]VP = Vapor Phase; LP is Liquid Phase

Lactic Acid Test

| | Adhesion (VP/LP)[1] | Blush(VP/LP) |
| --- | --- | --- |
| Epoxy Control | 1/9 | 1/1 |
| High Phenolic | 0/3 | 0/1 |
| Low Phenolic | 1/9 | 1/3 |

[1]VP = Vapor Phase; LP is Liquid Phase

Mushy Pea Test

| | Corrosion (VP/LP)[1] | Adhesion (VP/LP) | Blush(VP/LP) |
| --- | --- | --- | --- |
| Epoxy Control | 0/3 | 1/2 | 0/0 |
| High Phenolic | 0/1 | 1/1 | 0/0 |
| Low Phenolic | 0/4 | 1/4 | 2/4 |

[1]VP = Vapor Phase; LP is Liquid Phase

What is claimed is:

1. A coating composition comprising an aqueous dispersion, which aqueous dispersion comprises a ethylene (meth)acrylic acid copolymer, a phenolic crosslinker, and water, wherein
the ethylene (meth)acrylic acid copolymer has a number average molecular weight of 2500-4500 Da, a weight average molecular weight of 5500-9000 Da, and a (meth)acrylic acid content of 15-20 wt %, and the aqueous dispersion is substantially free of stabilizing agent.

2. The coating composition according to claim 1, wherein the ethylene (meth)acrylic acid copolymer comprises ethylene acrylic acid (EAA) copolymer.

3. The coating composition according to claim 1, wherein the ethylene (meth)acrylic acid copolymer comprises ethylene methacrylic acid (EMA) copolymer.

4. The coating composition according to claim 1, wherein the aqueous dispersion further comprises a solution acrylic dispersant.

5. The coating composition according to claim 1, wherein the aqueous dispersion further comprises a hydroxyalkylamide crosslinker.

6. The coating composition according to claim 1, wherein the hydroxyalkylamide crosslinker is a beta-hydroxyalkylamide crosslinker.

7. The coating composition according to claim 6, wherein the beta-hydroxyalkylamide crosslinker is N,N,N',N'-tetrakis-(2-hydroxyethyl)-adipamide.

8. The coating composition according to claim 1, further comprising an acrylic rheology modifier.

9. The coating composition according to claim 1, wherein the aqueous dispersion further comprises a neutralizer.

10. The coating composition according to claim 9, wherein the neutralizer is ammonia/ammonium hydroxide, dimethylethanolamine, 2-dimethylamino-2-methyl-1-propanol, tributylamine, morpholine, diethanolamine, triethanolamine, monoethanolamine, sodium hydroxide, potassium hydroxide, lithium hydroxide, or a combination thereof.

11. A method of making a coating composition, the method comprising
(a) dispersing an ethylene (meth)acrylic acid copolymer in water, optionally with a neutralizer, to form a copolymer dispersion, wherein the ethylene (meth)acrylic acid copolymer has a number average molecular weight of 2500-4500 Da, a weight average molecular weight of 5500-9000 Da, and a (meth)acrylic acid content of 15-20 wt %;
(b) dispersing a phenolic resin in water, optionally with a solution acrylic dispersant, to form a phenolic dispersion;
(c) mixing the copolymer dispersion of (a) with the phenolic dispersion of (b); and
(d) optionally adding an acrylic rheology modifier;
wherein the coating composition is substantially free of stabilizing agent.

12. The method according to claim 11, wherein the ethylene (meth)acrylic acid copolymer comprises ethylene acrylic acid (EAA) copolymer and/or ethylene methacrylic acid (EMA) copolymer.

13. The method according to any of claim 11, wherein the copolymer dispersion further comprises a solution acrylic dispersant.

14. The method according to claim 11, wherein the copolymer dispersion further comprises a hydroxyalkylamide crosslinker.

15. The method according to claim 14, wherein the hydroxyalkylamide crosslinker is a beta-hydroxyalkylamide crosslinker.

16. The method according to claim 15, wherein the beta-hydroxyalkylamide crosslinker is N,N,N',N'-tetrakis-(2-hydroxyethyl)-adipamide.

17. The method according to claim 11, further comprising an acrylic rheology modifier, and/or a neutralizer.

18. The method according to claim 17, wherein the neutralizer is ammonia/ammonium hydroxide, dimethylethanolamine, 2-dimethylamino-2-methyl-1-propanol, tributylamine, morpholine, diethanolamine, triethanolamine, monoethanolamine, sodium hydroxide, potassium hydroxide, lithium hydroxide, or a combination thereof.

19. A substrate coated with the coating composition of claim 1.

20. A method of coating a substrate comprising applying the coating composition according to claim 1 to the substrate.

* * * * *